(12) United States Patent
Masuda et al.

(10) Patent No.: US 11,105,281 B2
(45) Date of Patent: Aug. 31, 2021

(54) MARINE ENGINE

(71) Applicant: IHI CORPORATION, Tokyo (JP)

(72) Inventors: Yutaka Masuda, Tokyo (JP);
Yoshiyuki Umemoto, Hyogo (JP);
Toshihiko Shimizu, Hyogo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 17/021,357

(22) Filed: Sep. 15, 2020

(65) Prior Publication Data

US 2020/0408160 A1     Dec. 31, 2020

Related U.S. Application Data

(63) Continuation of application No. PCT/JP2019/010586, filed on Mar. 14, 2019.

(30) Foreign Application Priority Data

Mar. 16, 2018 (JP) .............................. JP2018-050006

(51) Int. Cl.
*F02D 15/02* (2006.01)
*F02D 41/00* (2006.01)
(Continued)

(52) U.S. Cl.
CPC ......... *F02D 41/0002* (2013.01); *B63H 21/38* (2013.01); *F02D 13/0242* (2013.01); *F02D 15/02* (2013.01); *F02D 41/38* (2013.01)

(58) Field of Classification Search
CPC .. F02D 41/0002; F02D 41/38; F02D 13/0242; F02D 15/02; F02D 17/00; F02D 17/02; B63H 21/38; F02B 75/04
(Continued)

(56) References Cited

U.S. PATENT DOCUMENTS 6,174,264 B1    1/2001  Hoshiba et al.
2008/0254690 A1  10/2008  Kishibata
(Continued)

FOREIGN PATENT DOCUMENTS

JP    S58-222974 A    12/1983
JP    S60-108533 A     6/1985
(Continued)

OTHER PUBLICATIONS

International Search Report for PCT/JP2019/010586 with its English translation dated Apr. 16, 2019, 4 pages.
(Continued)

*Primary Examiner* — Hai H Huynh
(74) *Attorney, Agent, or Firm* — Rothwell, Figg, Ernst & Manbeck, P.C.

(57) ABSTRACT

Provided is a marine engine, including: an air controller configured to supply compressed air to a combustion chamber in an upstroke of a piston after a crash astern signal is output; a fuel controller configured to stop supply of fuel to the combustion chamber when the crash astern signal is output, and to resume the supply of the fuel after a backward rotation of a crankshaft; and a compression ratio controller configured to move a top dead center position of the piston toward an opposite side of a bottom dead center position of the piston when the crash astern signal is output, and the top dead center position of the piston is on the bottom dead center position side with respect to a predetermined position set in advance.

2 Claims, 6 Drawing Sheets

(51) Int. Cl.
    *B63H 21/38*     (2006.01)
    *F02D 13/02*     (2006.01)
    *F02D 41/38*     (2006.01)

(58) Field of Classification Search
    USPC .......... 123/481, 198 D, 198 DB, 48 B, 78 E
    See application file for complete search history.

(56)         References Cited

U.S. PATENT DOCUMENTS

2008/0302334  A1     12/2008   Kotou et al.
  2017/0175616  A1      6/2017   Masuda et al.

FOREIGN PATENT DOCUMENTS

JP          H05-332228  A      12/1993
  JP          H10-238378  A       9/1998
  JP          2004-225605 A       8/2004
  JP          2006-029099 A       2/2006
  JP          2007-239519 A       9/2007
  JP          2008-260413 A      10/2008
  JP          2009-115102 A       5/2009
  JP          2012-007515 A       1/2012
  JP             5842078  B1      1/2016
  JP             5874236  B2      3/2016
  JP          2016-089642 A       5/2016
  JP          2017-036714 A       2/2017
  JP          2017-172375 A       9/2017

OTHER PUBLICATIONS

JP Office Action dated Oct. 20, 2020 for Application No. 2018-050006 (3 pages).

MARINE ENGINE

CROSS REFERENCE TO RELATED APPLICATIONS

This application is a continuation application of International Application No. PCT/JP2019/010586, filed on Mar. 14, 2019, which claims priority to Japanese Patent Application No. 2018-050006, filed on Mar. 16, 2018, the entire contents of which are incorporated by reference herein.

BACKGROUND ART

Technical Field

The present disclosure relates to a marine engine.

Related Art

A technology for changing a top dead center position of a piston has been developed for an engine. For example, in Patent Literature 1, there is described an engine mounted to a vehicle, in which a pumping loss is increased by moving a top dead center position of a piston toward an opposite side of a bottom dead center position. As the pumping loss increases, a braking force increases.

CITATION LIST

Patent Literature

Patent Literature 1: JP 5874236 B2

SUMMARY

Technical Problem

Incidentally, in a marine engine, a crash astern signal for instructing a quick stop is output in an emergency. In this case, a quicker stop of a ship is required.

In view of the above-mentioned problem, the present disclosure has an object to provide a marine engine capable of achieving a quicker stop of a ship in an emergency.

Solution to Problem

In order to solve the above-mentioned problem, according to one embodiment of the present disclosure, there is provided a marine engine, including: an air controller configured to supply compressed air to a combustion chamber in an upstroke of a piston after a crash astern signal is output; a fuel controller configured to stop supply of fuel to the combustion chamber when the crash astern signal is output, and to resume the supply of the fuel after a backward rotation of a crankshaft; and a compression ratio controller configured to move a top dead center position of the piston toward an opposite side of a bottom dead center position of the piston when the crash astern signal is output, and the top dead center position of the piston is on the bottom dead center position side with respect to a predetermined position set in advance.

The marine engine may include an exhaust controller configured to advance a crank angle at which an exhaust valve is opened within a range of a downstroke of the piston when the crash astern signal is output.

Effects of Disclosure

According to the marine engine of the present disclosure, it is possible to achieve a quicker stop of a ship in an emergency.

DESCRIPTION OF EMBODIMENTS

Figure 1:
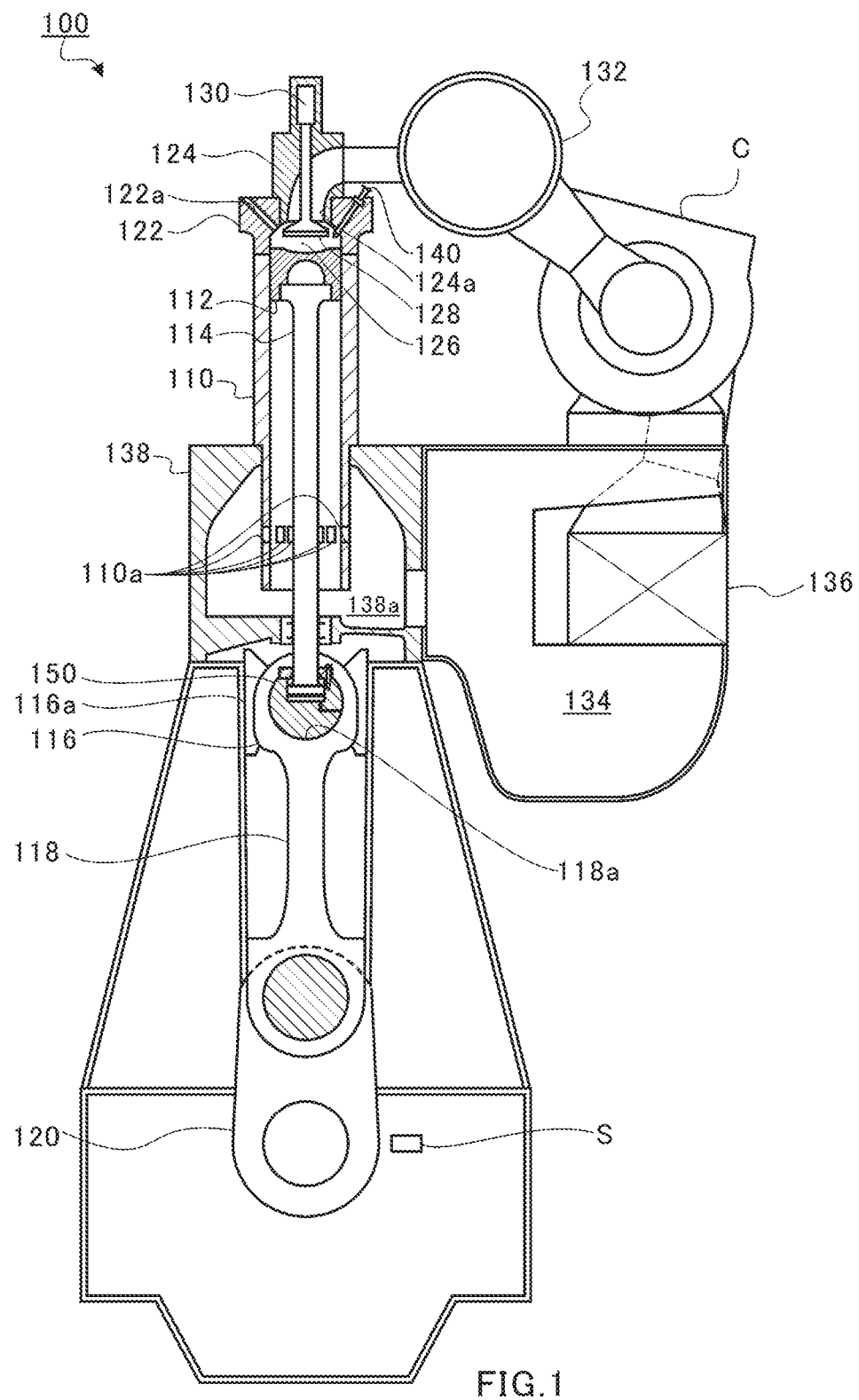
FIG. 1 is an explanatory view for illustrating an overall configuration of a marine engine.

Now, with reference to the attached drawings, an embodiment of the present disclosure is described in detail. The dimensions, materials, and other specific numerical values represented in the embodiment are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is an explanatory view for illustrating an overall configuration of a marine engine 100. As illustrated in FIG. 1, the marine engine 100 includes a cylinder 110, a piston 112, a piston rod 114, a crosshead 116, a connecting rod 118, a crankshaft 120, a cylinder cover 122, an exhaust valve cage 124, a combustion chamber 126, an exhaust valve 128, an exhaust valve drive device 130, an exhaust pipe 132, a scavenge reservoir 134, a cooler 136, a cylinder jacket 138, and a fuel injection valve 140.

The piston 112 is provided inside the cylinder 110. The piston 112 reciprocates inside the cylinder 110. One end of the piston rod 114 is attached to the piston 112. A crosshead pin 150 of the crosshead 116 is coupled to another end of the piston rod 114. The crosshead 116 reciprocates together with the piston 112. A movement of the crosshead 116 in a right-and-left direction (direction perpendicular to a stroke direction of the piston 112) is FIG. 1 is regulated by a guide shoe 116a.

The crosshead pin 150 is axially supported by a crosshead bearing 118a provided at one end of the connecting rod 118. The crosshead pin 150 supports one end of the connecting rod 118. The another end of the piston rod 114 and the one end of the connecting rod 118 are connected to each other through an intermediation of the crosshead 116.

Another end of the connecting rod 118 is coupled to the crankshaft 120. The crankshaft 120 is rotatable with respect to the connecting rod 118. When the crosshead 116 reciprocates along with the reciprocation of the piston 112, the crankshaft 120 rotates. A crank angle sensor S is provided in a vicinity of the crankshaft 120. The crank angle sensor S is configured to detect a crank angle.

The cylinder cover 122 is provided at a top end of the cylinder 110. The exhaust valve cage 124 is inserted through the cylinder cover 122. One end of the exhaust valve cage 124 faces the piston 112. An exhaust port 124a is opened in the one end of the exhaust valve cage 124. The exhaust port 124a is opened to the combustion chamber 126. The exhaust chamber 126 is formed inside the cylinder 110 so as to be surrounded by the cylinder cover 122, the cylinder 110, and the piston 112.

An air port 122a is formed in the cylinder cover 122. One end of the air port 122a is opened to the combustion chamber 126. Another end of the air port 122a communicates with an air pump 190 described later.

A valve body of the exhaust valve 128 is located in the combustion chamber 126. An exhaust valve drive device 130 is attached to a rod portion of the exhaust valve 128. The exhaust valve drive device 130 is arranged in the exhaust valve cage 124. The exhaust valve drive device 130 moves the exhaust valve 128 in the stroke direction of the piston 112.

When the exhaust valve 128 moves toward the piston 112 side to open, exhaust gas generated in the cylinder 110 after combustion is discharged from the exhaust port 124a. After the exhaust gas is discharged, the exhaust valve 128 moves toward the exhaust valve cage 124 side to close the exhaust port 124a.

An exhaust pipe 132 is attached to the exhaust valve cage 124 and a supercharger C. An inside of the exhaust pipe 132 communicates with the exhaust port 124a and a turbine of the supercharger C. The exhaust gas discharged from the exhaust port 124a is supplied to the turbine of the supercharger C through the exhaust pipe 132, and is then discharged to the outside.

Moreover, active gas is pressurized by a compressor of the supercharger C. In this state, the active gas is, for example, air. The pressurized active gas is cooled by the cooler 136 in the scavenge reservoir 134. A bottom end of the cylinder 110 is surrounded by a cylinder jacket 138. A scavenge chamber 138a is formed inside the cylinder jacket 138. The active gas after the cooling is forcibly fed into the scavenge chamber 138a.

Scavenging ports 110a are formed on a bottom end side of the cylinder 110. The scavenging port 110a is a hole passing from an inner peripheral surface to an outer peripheral surface of the cylinder 110. A plurality of scavenging ports 110a are formed at intervals in a circumferential direction of the cylinder 110.

When the piston 112 moves toward the bottom dead center side with respect to the scavenging ports 110a, the active gas is sucked from the scavenging ports 110a into the cylinder 110 by a pressure difference between the scavenge chamber 138a and the inside of the cylinder 110.

Moreover, a fuel injection valve 140 is provided in the cylinder cover 122. A distal end of the fuel injection valve 140 is directed toward the combustion chamber 126 side. The fuel injection valve 140 injects a liquid fuel (fuel oil) into the combustion chamber 126. The liquid fuel is combusted, and expansion pressure generated by the combustion causes the piston 112 to reciprocate.

Figure 2:
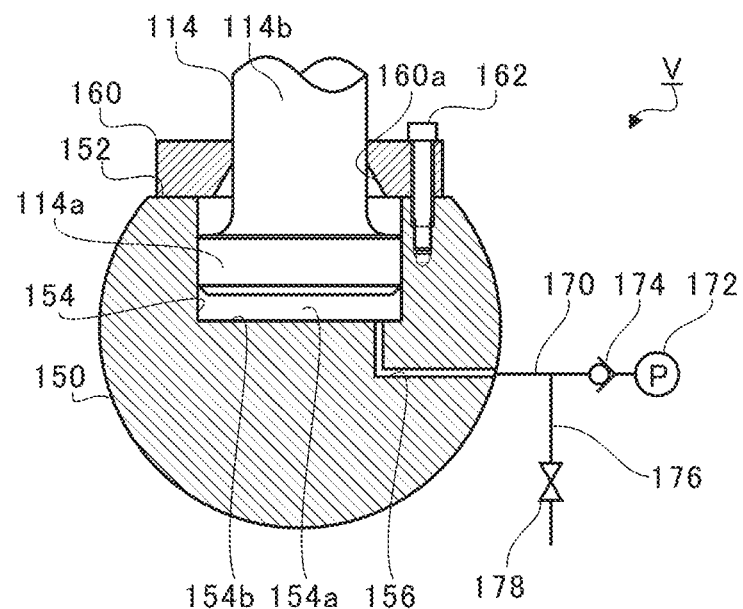
FIG. 2 is an extracted view for illustrating a coupling portion between a piston rod and a crosshead pin.

FIG. 2 is an extracted view for illustrating a coupling portion between the piston rod 114 and the crosshead pin 150. As illustrated in FIG. 2, a flat surface portion 152 is formed on an outer peripheral surface on the piston 112 side of the crosshead pin 150. The flat surface portion 152 extends in a direction substantially perpendicular to the stroke direction of the piston 112.

A pin hole 154 is formed in the crosshead pin 150. The pin hole 154 is opened in the flat surface portion 152. The pin hole 154 extends from the flat surface portion 152 toward the crankshaft 120 side (lower side in FIG. 2) along the stroke direction.

A cover member 160 is provided on the flat surface portion 152 of the crosshead pin 150. The cover member 160 is attached to the flat surface portion 152 of the crosshead pin 150 by a fastening member 162. The cover member 160 covers the pin hole 154. A cover hole 160a passing in the stroke direction is formed in the cover member 160.

The piston rod 114 includes a large-diameter portion 114a and a small-diameter portion 114b. An outer diameter of the large-diameter portion 114a is larger than an outer diameter of the small-diameter portion 114b. The large-diameter portion 114a is formed at the another end of the piston rod 114. The large-diameter portion 114a is inserted into the pin hole 154 of the crosshead pin 150. The small-diameter portion 114b is formed at the one end side of the piston rod 114 with respect to the large-diameter portion 114a. The small-diameter portion 114b is inserted into the cover hole 160a of the cover member 160.

A hydraulic chamber 154a is formed inside the pin hole 154. The pin hole 154 is partitioned by the large-diameter portion 114a in the stroke direction. The hydraulic chamber 154a is a space defined on a bottom surface 154b side of the pin hole 154 partitioned by the large-diameter portion 114a.

One end of an oil passage 156 is opened in the bottom surface 154b. Another end of the oil passage 156 is opened to an outside of the crosshead pin 150. A hydraulic pipe 170 is connected to the another end of the oil passage 156. A hydraulic pump 172 communicates with the hydraulic pipe 170. A check valve 174 is provided between the hydraulic pump 172 and the oil passage 156. A flow of working oil flowing from the oil passage 156 side toward the hydraulic pump 172 side is suppressed by the check valve 174. The working oil is forcibly fed into the hydraulic chamber 154a from the hydraulic pump 172 through the oil passage 156.

A branch pipe 176 is connected to the hydraulic pipe 170 between the oil passage 156 and the check valve 174. A selector valve 178 is provided to the branch pipe 176. The selector valve 178 is, for example, an electromagnetic valve. The selector valve 178 is closed during an operation of the hydraulic pump 172. When the selector valve 178 is opened while the hydraulic pump 172 is stopped, the working oil is discharged from the hydraulic chamber 154a toward the branch pipe 176 side. The selector valve 178 communicates with an oil tank (not shown) on a side opposite to the oil passage 156. The discharged working oil is retained in the oil tank. The oil tank supplies the working oil to the hydraulic pump 172.

The large-diameter portion 114a slides on an inner peripheral surface of the pin hole 154 in the stroke direction in accordance with an oil amount of the working oil in the hydraulic chamber 154a. As a result, the piston rod 114 moves in the stroke direction. The piston 112 moves together with the piston rod 114. Accordingly, the top dead center position of the piston 112 is variable.

That is, the marine engine 100 includes a compression ratio changing mechanism V. The compression ratio changing mechanism V includes the hydraulic chamber 154a and the large-diameter portion 114a of the piston rod 114. The compression ratio changing mechanism V moves the top dead center position of the piston 112 so that the compression ratio is changeable.

The description has been given of the case in which the one hydraulic chamber 154a is provided. However, a space on the cover member 160 side of the pin hole 154 partitioned by the large-diameter portion 114a may also be a hydraulic chamber. This hydraulic chamber may be used together with the hydraulic chamber 154a or may be used individually.

Figure 3:
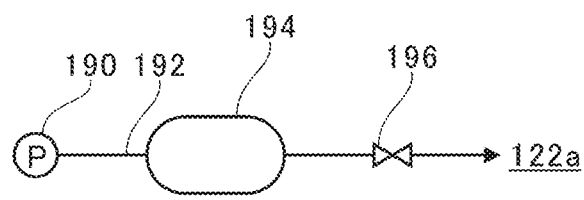
FIG. 3 is a diagram for illustrating the structure for supply of compressed air.

FIG. 3 is a diagram for illustrating the structure for supply of compressed air. As illustrated in FIG. 3, the marine engine 100 includes the air pump 190, an air pipe 192, an accumulator 194, and an air valve 196. The air pump 190 is connected to the air port 122a of the cylinder cover 122 by the air pipe 192.

The accumulator 194 is provided on the air pipe 192. The air pump 190 is configured to compress the air sucked from the outside, and to feed out the compressed air to the accumulator 194. The fed-out compressed air is stored (accumulated) in the accumulator 194. The air valve 196 is provided on the air pipe 192 between the accumulator 194 and the air port 122a. The air valve 196 is, for example, an electromagnetic valve.

The compressed air accumulated in the accumulator 194 is used to start the marine engine 100 and to stop a ship in an emergency. A detailed description of the compressed air is given later.

Figure 4:
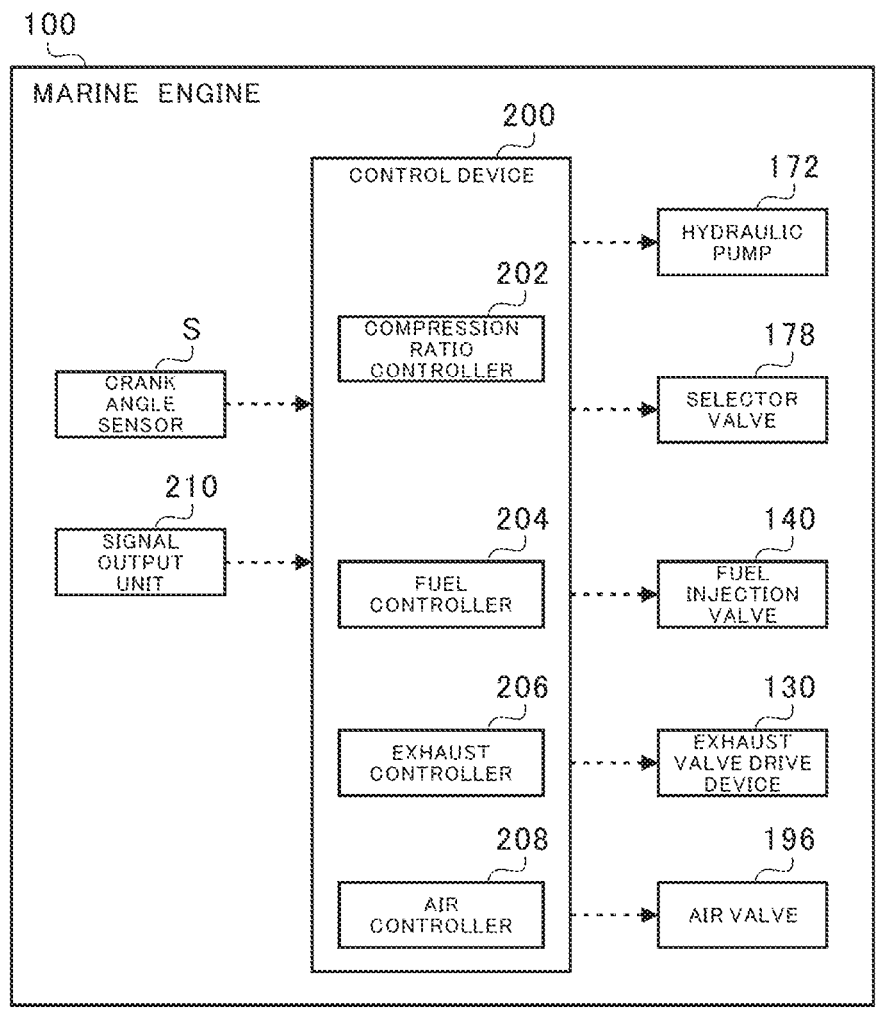
FIG. 4 is a functional block diagram for illustrating the marine engine.

FIG. 4 is a functional block diagram for illustrating the marine engine 100. In FIG. 4, a configuration relating to control for the compression ratio changing mechanism V, the fuel injection valve 140, and the air valve 196 is mainly illustrated. As illustrated in FIG. 4, the marine engine 100 includes a control device 200. The control device 200 is formed of, for example, an engine control unit (ECU). The control device 200 is formed of a central processing unit (CPU), a ROM storing programs and the like, a RAM serving as a work area, and the like, and is configured to control the entire marine engine 100. Moreover, the control device 200 functions as a compression ratio controller 202, a fuel controller 204, an exhaust controller 206, and an air controller 208.

The compression ratio controller 202 is configured to control the hydraulic pump 172 and the selector valve 178, to thereby move the top dead center position of the piston 112. For example, during normal navigation, the compression ratio controller 202 controls the top dead center position of the piston 112 such that a compression ratio determined in accordance with an operation condition is achieved.

The fuel controller 204 is configured to control the fuel injection valve 140, to thereby control an injection amount and an injection timing of the fuel. For example, during the normal navigation, the fuel controller 204 controls the fuel injection valve 140 such that an injection amount and an injection timing of the fuel determined in accordance with the operation condition are achieved.

The exhaust controller 206 is configured to control the exhaust valve drive device 130, to thereby open and close the exhaust valve 128. For example, during the normal navigation, the exhaust controller 206 controls the exhaust valve drive device 130 such that an opening timing and a closing timing of the exhaust valve 128 determined in accordance with the operation condition are achieved.

The air controller 208 is configured to control the air valve 196, to thereby supply the compressed air to the combustion chamber 126. For example, at the time of starting the marine engine 100, the air controller 208 supplies the compressed air to the combustion chamber 126. When the rotation of the crankshaft 120 starts, the air controller 208 supplies the compressed air to the combustion chamber 126 at a timing at which rotation of the crankshaft 120 in a forward rotation direction (rotation direction for the ship to move forward) is promoted. That is, the air controller 208 supplies the compressed air to the combustion chamber 126 in the downstroke of the piston 112. The piston 112 is pressed by the compressed air, thereby being moved in the stroke direction. After reciprocation of the piston 112 starts, the fuel is injected by the fuel injection valve 140.

Moreover, the marine engine 100 includes a signal output unit 210. The signal output unit 210 is formed of, for example, an operation device such as an emergency button. The signal output unit 210 is configured to output a crash astern signal in accordance with operation input. The crash astern signal is a signal for instructing the marine engine 100 to perform an emergency stop of the ship. Description has been given of the case in which the signal output unit 210 outputs the crash astern signal in accordance with the operation input. However, for example, when it is determined that the emergency stop of the ship is required based on various sensor output, the signal output unit 210 may output the crash astern signal.

Figure 5A:
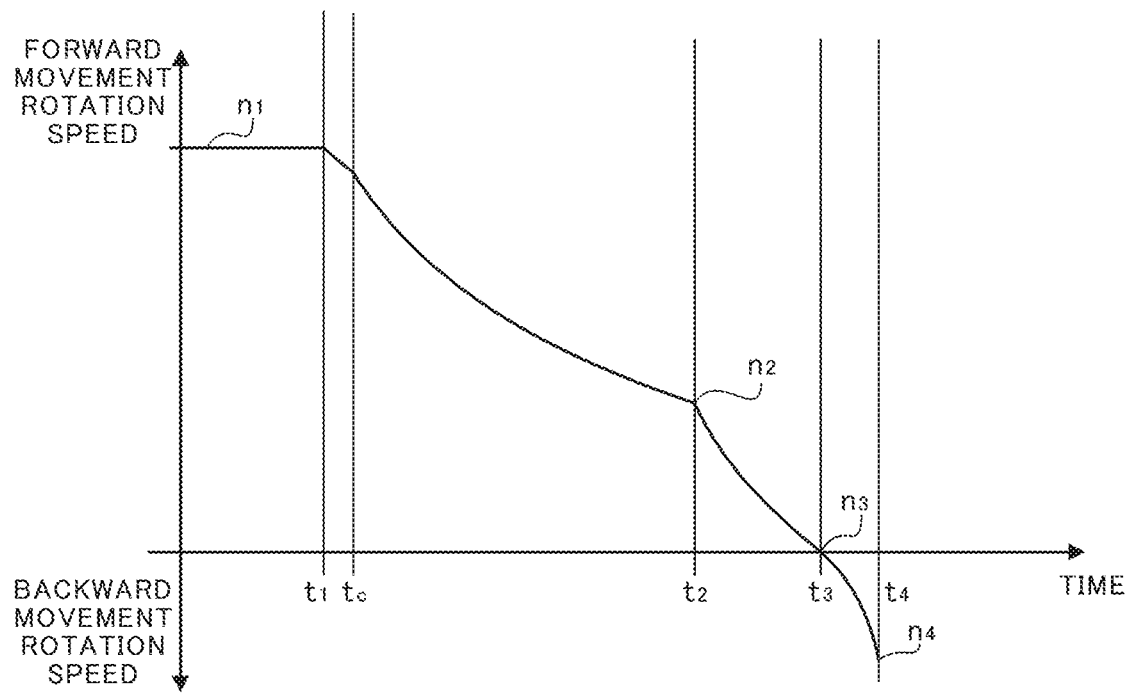
FIG. 5A is a graph for showing a stop of a ship in an emergency.
Figure 5B:
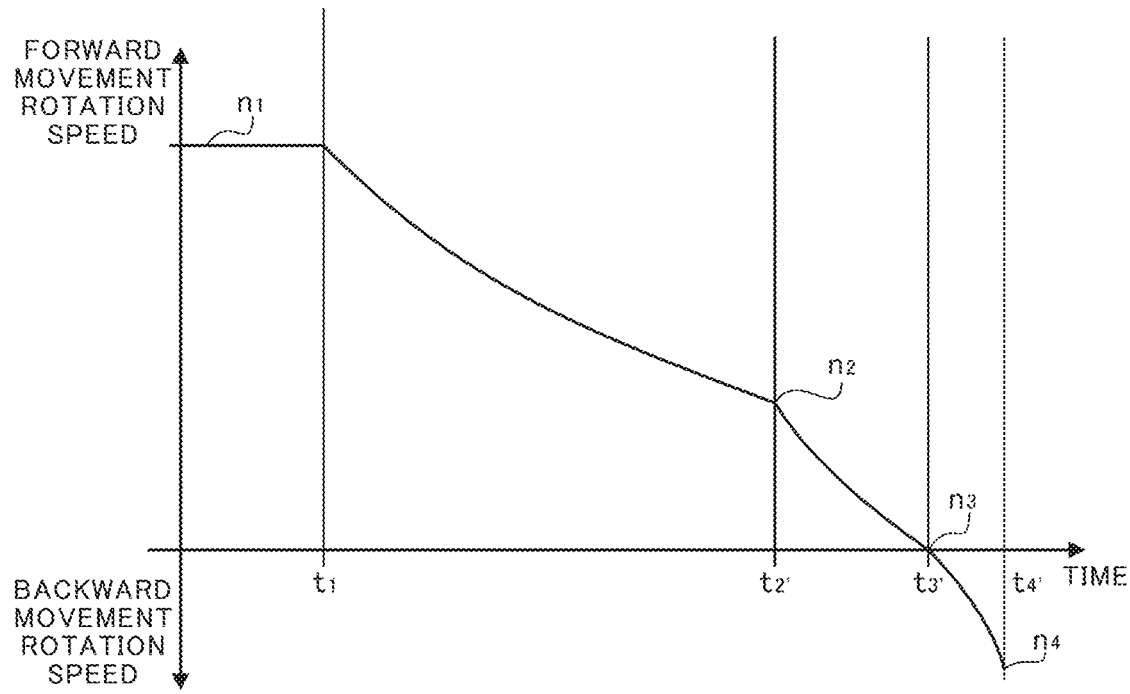
FIG. 5B is a graph for showing a comparative example.

FIG. 5A is a graph for showing the emergency stop of the ship. FIG. 5B is a graph for showing a comparative example. As shown in FIG. 5A, it is assumed that, during navigation at a forward movement rotation speed n1 (the engine rotation speed in a forward movement direction is hereinafter referred to as "forward movement rotation speed"), the crash astern signal is output (time point $t_1$). The fuel controller 204 immediately stops the supply of the fuel to the combustion chamber 126.

Moreover, it is assumed that there is a margin for increasing the compression ratio at the time point $t_1$. That is, it is assumed that the top dead center position of the piston 112 is on a bottom dead center position side with respect to a position corresponding to the highest compression ratio in a movable range. The compression ratio controller 202 operates the hydraulic pump 172 while the selector valve 178 is closed. As a result, forcible feeding of the working oil into the hydraulic chamber 154a is started. The forcible feeding is completed at a time point $t_c$, and the top dead center position of the piston 112 moves most toward the exhaust valve 128 side. That is, the compression ratio becomes highest.

Figure 6:
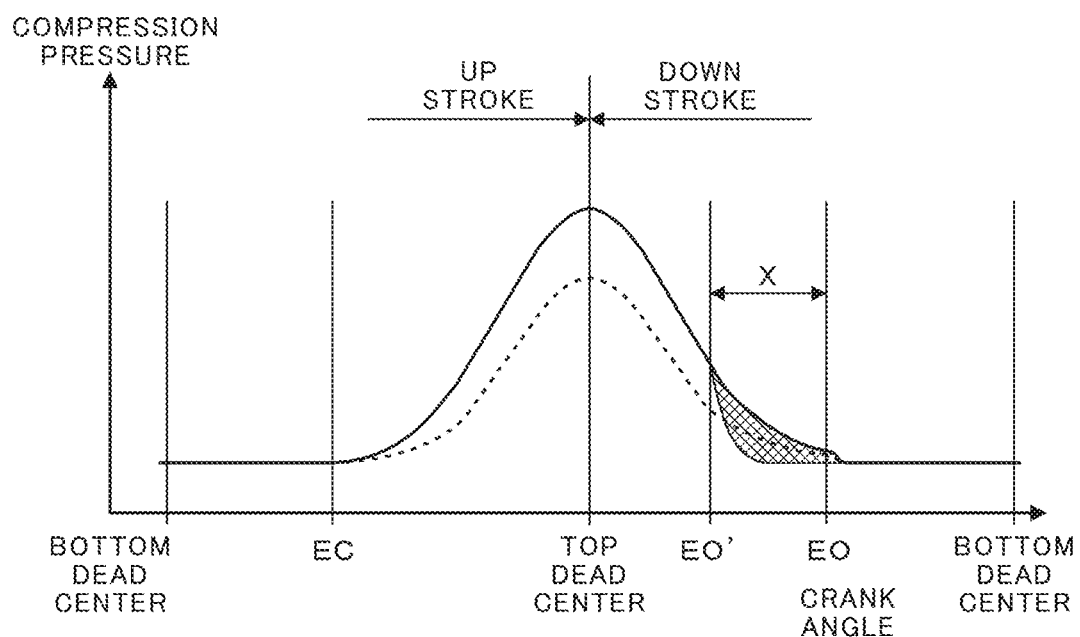
FIG. 6 is a graph for showing compression pressure of gas compressed by a piston in a combustion chamber.

FIG. 6 is a graph for showing compression pressure of gas compressed by the piston 112 in the combustion chamber 126. Compared with a case of a low compression ratio indicated by a broken line of FIG. 6, work of the piston 112 (pumping loss) increases in the upstroke of the piston 112 in a case of a high compression ratio indicated by a solid line. Accordingly, a braking force increases, and a decrease speed of the engine rotation speed increases.

Moreover, it is assumed that a crank angle EO is given as a crank angle at which the exhaust valve 128 is opened at the above-mentioned time point $t_1$. The exhaust controller 206 advances the crank angle at which the exhaust valve 128 is opened (for example, to a crank angle EO') within a range of the downstroke of the piston 112 when the crash astern signal is output.

The air in the combustion chamber 126 presses the piston 112 while expanding in the downstroke of the piston 112. Accordingly, the decrease in engine rotation speed is hindered. When the crank angle at which the exhaust valve 128 is opened is advanced as described above, the work of pressing the piston 112 by the air in the combustion chamber 126 is reduced by an amount corresponding to an angle X representing a difference between the crank angle EO and the crank angle EO' (crosshatching of FIG. 6 indicates an example of the reduced amount). Accordingly, the decrease speed of the engine rotation speed increases.

A forward movement rotation speed n2 falls below a first threshold value set in advance at a time point $t_2$ shown in FIG. 5A. The air controller 208 supplies the compressed air to the combustion chamber 126 at a timing at which the rotation of the crankshaft 120 in the backward rotation direction (rotation direction for the ship to move backward) is promoted. That is, the air controller 208 supplies the compressed air to the combustion chamber 126 in the upstroke of the piston 112.

When the decrease speed of the engine rotation speed is further increased by the compressed air, and the engine rotation speed becomes approximately 0 at a time point $t_3$, an operation for instructing the marine engine 100 to rotate backward is carried out, and the backward rotation operation is started. After the marine engine 100 starts the backward rotation operation (after the crankshaft 120 starts rotating backward), the ship starts moving backward. The exhaust controller 206 restores (retards) the crank angle at which the exhaust valve 128 is opened. The air controller 208 supplies the compressed air to the combustion chamber 126 in the downstroke of the piston 112. The compressed air is used to start the rotation in the backward rotation direction.

When a backward movement rotation speed (the engine rotation speed in a backward movement direction is hereinafter referred to as "backward movement rotation speed") exceeds a second threshold value set in advance, the fuel controller 204 resumes the injection of the fuel by the fuel injection valve 140. When the backward movement rotation speed exceeds a third threshold value set in advance at a time point $t_4$, the marine engine 100 is stopped, and the ship accordingly stops.

As described above, in the marine engine 100, when the crash astern signal is output, and there is a margin for increasing the compression ratio, the compression ratio controller 202 moves the top dead center position of the piston 112 toward the opposite side of the bottom dead center position. Moreover, the crank angle at which the exhaust valve 128 is opened is advanced. As a result, the braking force increases. Meanwhile, in the comparative example shown in FIG. 5B, any one of the increase in compression ratio and the advance of the crank angle at which the exhaust valve 128 is opened is not executed. Compared with time points $t_2'$, $t_3'$, and $t_4'$ of that comparative example, the time points $t_2$, $t_3$, and $t_4$ shown in FIG. 5A are advanced. Accordingly, a quicker stop of the ship in an emergency is achieved.

Moreover, the compression ratio controller 202 maintains the high compression ratio even after the backward rotation operation starts. Therefore, the small volume of the combustion chamber 126 is maintained, and a consumption amount of the compressed air is thus suppressed. As a result, energy consumption of the air pump 190 is suppressed. Further, when the backward rotation operation starts, ignitability of the fuel increases due to the high compression ratio, and stability is thus achieved.

In this embodiment, description is given of the case in which the compression ratio controller 202 is configured to move the top dead center position of the piston 112 toward the opposite side of the bottom dead center position when there is a margin for increasing the compression ratio. However, the compression ratio controller 202 may be configured to move the top dead center position of the piston 112 toward the opposite side of the bottom dead center position when the top dead center position of the piston 112 is on the bottom dead center position side with respect to a predetermined position set in advance. That is, a position at which the compression ratio is the highest or a position at which the compression ratio is lower than the highest compression ratio may be set as the predetermined position set in advance.

Figure 7:
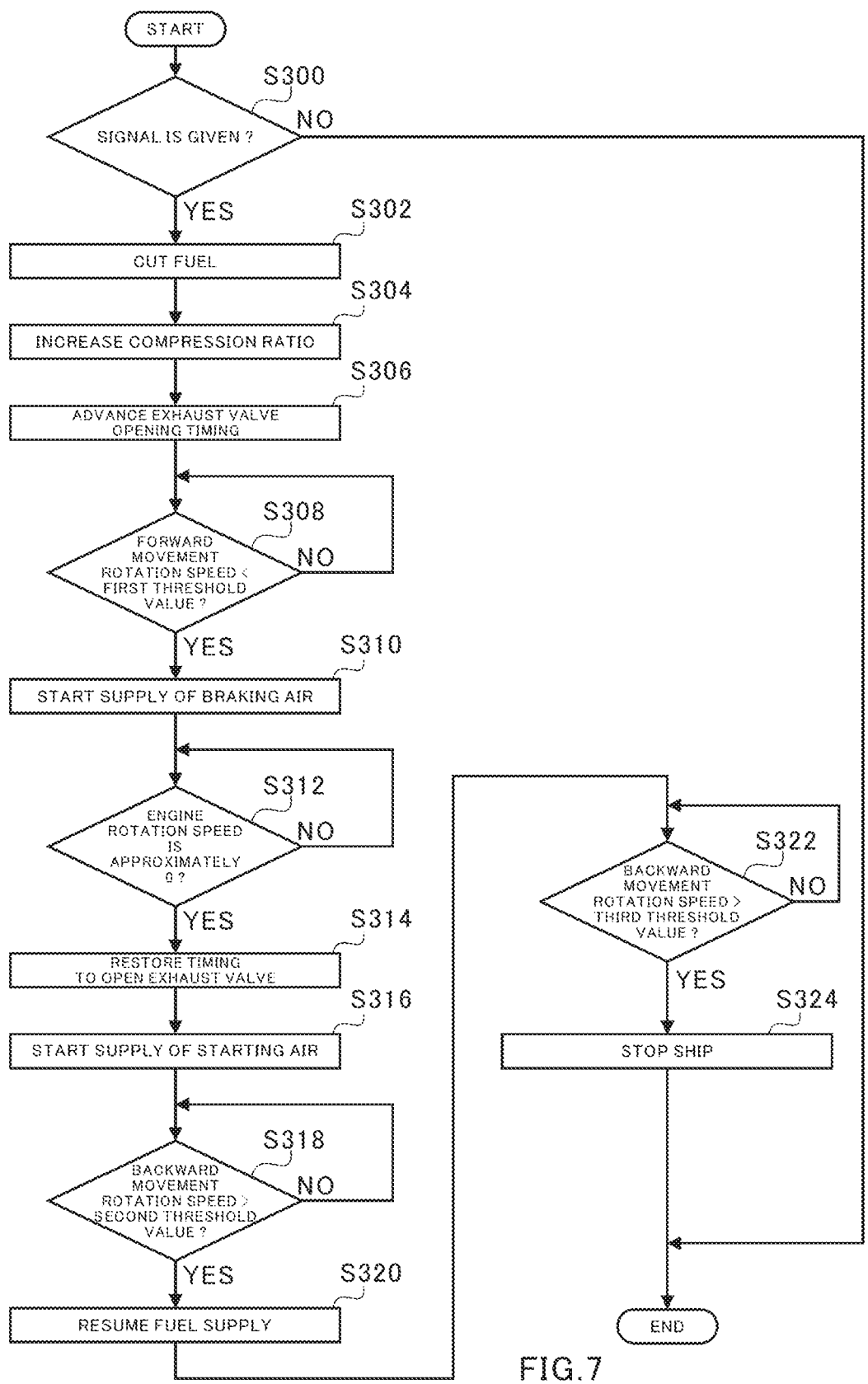
FIG. 7 is a flowchart for illustrating a flow of ship stopping processing in an emergency.

FIG. 7 is a flowchart for illustrating a flow of ship stopping processing in an emergency. The processing illustrated in FIG. 7 is repeated at predetermined cycles.

The fuel controller 204 determines whether or not the crash astern signal is output (Step S300). When the crash astern signal is output (YES in Step S300), the processing proceeds to Step S302. When the crash astern signal is not output (NO in Step S300), this ship stopping processing is finished.

The fuel controller 204 stops the supply of the fuel to the combustion chamber 126 (Step S302). When there is a margin for increasing the compression ratio, the compression ratio controller 202 moves the top dead center position of the piston 112 most toward the exhaust valve 128 side (sets the compression ratio to the highest compression ratio) (Step S304).

The exhaust controller 206 advances the crank angle at which the exhaust valve 128 is opened within the range of the downstroke of the piston 112 (Step S306).

The air controller 208 determines whether or not the forward movement rotation speed is lower than the first threshold value based on the signal from the crank angle sensor S (Step S308). When the forward movement rotation speed is equal to or higher than the first threshold value (NO in Step S308), the air controller 208 repeats Step S308. When the forward movement rotation speed is lower than the first threshold value (YES in Step S308), the processing proceeds to Step S310.

The air controller 208 starts supply of braking air, which is the supply of the compressed air to the combustion chamber 126, in the upstroke of the piston 112 (Step S310).

The fuel controller 204 determines whether or not the engine rotation speed is approximately 0 (within a predetermined range including 0) based on the signal from the crank angle sensor S (Step S312). When the engine rotation speed is not approximately 0 (NO in Step S312), the fuel controller 204 repeats Step S312. When the engine rotation speed is approximately 0 (YES in Step S312), the processing proceeds to Step S314.

The exhaust controller 206 restores (retards) the crank angle at which the exhaust valve 128 is opened (Step S314). The air controller 208 starts supply of starting air, which is the supply of the compressed air to the combustion chamber 126, in the downstroke of the piston 112 (Step S316).

The fuel controller 204 determines whether or not the backward movement rotation speed is higher than the second threshold value based on the signal from the crank angle sensor S (Step S318). When the backward movement rotation speed is equal to or lower than the second threshold value (NO in Step S318), the fuel controller 204 repeats Step S318. When the backward movement rotation speed is higher than the second threshold value (YES in Step S318), the processing proceeds to Step S320.

The fuel controller 204 resumes the supply of the fuel to the combustion chamber 126 (Step S320). The fuel controller 204 determines whether or not the backward movement rotation speed is higher than the third threshold value based on the signal from the crank angle sensor S (Step S322). When the backward movement rotation speed is equal to or lower than the third threshold value (NO in Step S322), the fuel controller 204 repeats Step S322. When the backward movement rotation speed is higher than the third threshold value (YES in Step S322), the processing proceeds to Step S324.

The control device 200 executes the ship stopping processing (Step S324). For example, the fuel controller 204 stops the supply of the fuel to the combustion chamber 126. The air controller 208 stops the supply of the compressed air to the combustion chamber 126.

The embodiment has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

For example, in the above-mentioned embodiment, the description is given of the marine engine 100 of the two-cycle type, the uniflow scavenging type, and the crosshead type as an example. However, the type of the engine is not limited to the two-cycle type, the uniflow scavenging type, and the crosshead type. It is only required that the present disclosure be applied to a marine engine.

Moreover, in the above-mentioned embodiment and modification examples, the description is given of the case in which the liquid fuel is used. However, for example, a gas fuel may be used. In this case, in addition to the fuel injection valve 140, a gas fuel injection valve is provided in a vicinity of the scavenging port 110a, or a portion of the cylinder 110 from the scavenging port 110a to the cylinder cover 122. The fuel gas is injected from the gas fuel injection valve, and then flows into the cylinder 110. When a small amount of the liquid fuel is injected from the fuel injection valve 140, a mixture of the fuel gas and active gas is ignited by combustion heat of the liquid fuel, and is then combusted. The fuel gas is gasified LNG, LPG (liquified petroleum gas), light oil, heavy oil, or the like. Moreover, the marine engine 100 may be, for example, of the dual fuel type, which selects a gas fuel or a liquid fuel to be used.

Moreover, in the above-mentioned embodiment, the description is given of the case in which the exhaust controller 206 advances the crank angle at which the exhaust valve 128 is opened within the range of the downstroke of the piston 112 when the crash astern signal is output. However, the exhaust controller 206 is not required to change the crank angle at which the exhaust valve 128 is opened.

Moreover, in the above-mentioned embodiment, an example of the variable compression ratio mechanism V is described, but the variable compression ratio mechanism may have any configuration as long as the mechanism changes the top dead center position of the piston 112 so as to be able to change the compression ratio. For example, a hydraulic pressure generation device as described in JP2016-211462A may be provided in place of the hydraulic pressure pump 172.

Moreover, when the marine engine 100 is started, or is at low load, the output of the turbocharger C is not fully secured, and hence an electric auxiliary blower is thus used up to a degree of a medium load. When the marine engine 100 is started, or is at the low load, a compression ratio is increased to be high by the compression ratio changing mechanism V, thereby suppressing a decrease in quality of the combustion even when the amount of the active gas is small. As a result, a use amount of the auxiliary blower is reduced, thereby being capable of reducing power consumption. Moreover, only a small rated air capacity is required in the auxiliary blower, and a size of the auxiliary blower, a size of a generator configured to supply electric power to the auxiliary blower, and a size of a drive engine for the generator are thus reduced.

INDUSTRIAL APPLICABILITY

The present discloser can be applied to the marine engine.

What is claimed is:

1. A marine engine, comprising:
an air controller configured to supply compressed air to a combustion chamber in an upstroke of a piston after a crash astern signal is output;
a fuel controller configured to stop supply of fuel to the combustion chamber when the crash astern signal is output, and to resume the supply of the fuel after a backward rotation of a crankshaft; and
a compression ratio controller configured to move a top dead center position of the piston toward an opposite side of a bottom dead center position of the piston when the crash astern signal is output, and the top dead center position of the piston is on the bottom dead center position side with respect to a predetermined position set in advance.

2. The marine engine according to claim 1, further comprising an exhaust controller configured to advance a crank angle at which an exhaust valve is opened within a range of a downstroke of the piston when the crash astern signal is output.

* * * * *